Dec. 9, 1947.  F. M. KELP  2,432,240
PORTABLE BEAM CUTTER
Filed Oct. 6, 1944  3 Sheets-Sheet 1

Inventor
Forrest M. Kelp
By Clarence A. O'Brien
and Harvey B. Jacobson
Attorneys Dec. 9, 1947.         F. M. KELP                    2,432,240
              PORTABLE BEAM CUTTER
              Filed Oct. 6, 1944              3 Sheets-Sheet 2

Inventor
Forrest M. Kelp

By Clarence A. O'Brien
and Harvey B. Jacobson
Attorneys

Dec. 9, 1947.  F. M. KELP  2,432,240
PORTABLE BEAM CUTTER
Filed Oct. 6, 1944  3 Sheets-Sheet 3

Inventor
Forrest M. Kelp
By Clarence A. O'Brien
and Harvey B. Jacobson
Attorneys Patented Dec. 9, 1947

2,432,240

UNITED STATES PATENT OFFICE 2,432,240

PORTABLE BEAM CUTTER

Forrest M. Kelp, Modesto, Calif.

Application October 6, 1944, Serial No. 557,462

4 Claims. (Cl. 266—23)

This invention relates to a portable beam cutter, and has for its object to provide a device by the use of which the cutting of I-beams, H-beams and the like may be done in an extremely short time as compared with the usual hand manipulated blow torch.

Another object of the invention is to provide an extremely simple and inexpensive device for manipulating an acetylene-oxygen or electric torch for cutting iron beams.

A further object of the invention is to provide a very easily portable device for holding and directing the movement of a cutting torch for cutting I-beams, channel beams, H-beams and other beams.

A still further object of the invention is to provide a simple, very light portable device whereby vertical and angular beam cuts may be made comparatively very rapidly and true.

And another object of the invention is to provide a blow torch manipulating device adapted to be supported upon a beam to be cut, quickly secured in position thereon, and quickly adjustable in order to make vertical or angular cuts.

Other features and advantages will become more readily apparent from the following description, and the accompanying illustrative drawings.

Figure 1:
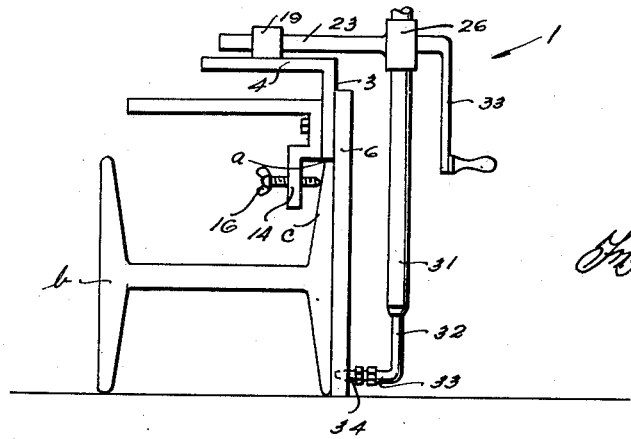
Figure 1 is an end elevational view of my device, shown applied to an I-beam.
Figure 2:
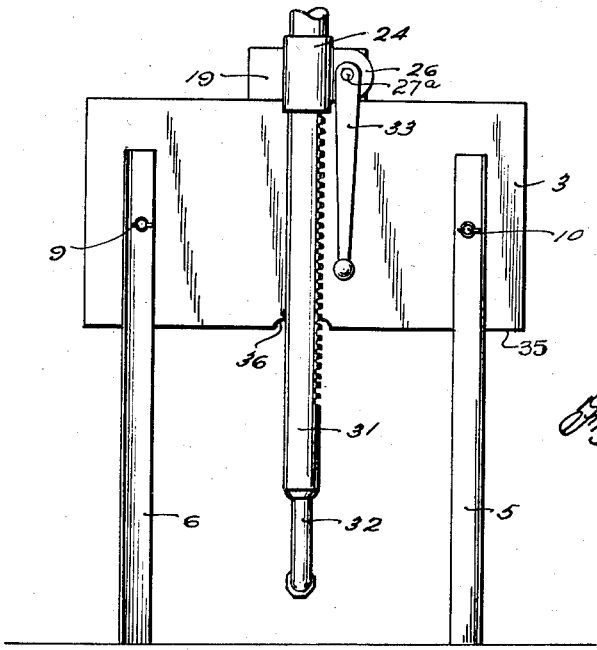
Figure 2 is a side elevation of the device.
Figure 3:
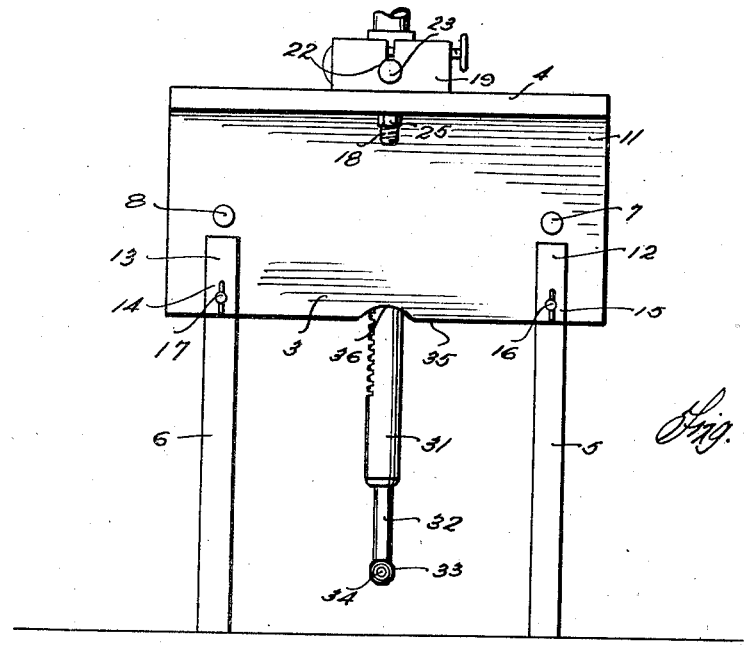
Figure 3 is a similar view taken on the opposite side.
Figure 4:
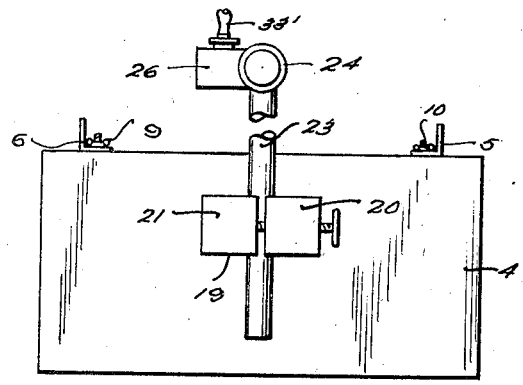
Figure 4 is a top plan view.

In steel structural work it is common practice to make certain necessary cuts of various beams, on the job, and it is common practice to do this work with a hand manipulated torch and necessarily such cuts cannot be very accurate and quite often such work is so ragged that machining becomes necessary. This whole procedure is slow and expensive and on this account I have designed a very simply constructed frame which may be quickly and easily and at the same time securely attached to the flange of a beam to be be cut, and as rapidly adjusted for desired cut and through the operation of the device an exceptionally true cut may be expeditiously made even by an apprentice workman and without the necessity of wearing a mask, or the danger of being burnt by moulten metal incident to this work.

It may be that a device for the same purpose may have been designed heretofore, but I am aware of no cutting machine of such very simple, accurate, rapid and inexpensive construction as the one herein disclosed, in which 1 indicates my invention which comprises an angle plate 2 consisting of a vertical flange 3, and a horizontal plate or table 4. Attached to the member 3 are a pair of angle iron legs 5 and 6 which legs are pivotally and adjustably connected to the vertical flange 3, by means of bolts 7 and 8, and secured by wing nuts 9 and 10.

Fixed to the rear surface 11 of member 3, are a pair of spaced apart hook members 12 and 13, their offset portions 14 and 15 each being provided with screw threaded bores to receive set screws 16 and 17. The table 4 is provided with a centrally disposed bore (not shown) to receive the pivot pin 18 of a pinch block 19, having spaced-apart jaw members 20 and 21, and a transverse bore 22 to receive the adjustably mounted horizontally disposed arm 23, to the outer end of which is fixed a sleeve 24 tightened by clamping screw 37. The pin 18 is screw threaded at its lower end to receive the set nut 25.

Integrally or otherwise secured to the sleeve 24 is a housing 26 for a pinion 27, the teeth 28 of which project through a slot 29 in the sleeve 24 to engage the rack 30 formed on the outer longitudinal surface of a tubular torch casing 31. The shaft 27a, upon which the pinion 27 is fixed, projects through the housing 26 and upon which a crank handle 33 is keyed. Fixed in the casing or torch rack 31, is a torch 32, which may be any one of several standard varieties, but must be equipped with a right angular, that is a 90" bevel lead 33', terminating in the machine cutting tip 34. The lower edge 35 of the flange or apron 3 is provided with a recess 36 into which the tip 34 may be raised in order to cut to the upper edge of a beam flange.

The operation of the device is very simple and is as follows: The edge 35 of the member 3 is seated upon the edge a, of a beam b, the hook members 14 and 15 overhanging the inner surface c of the flange a, the screws 16 and 17 being set to impinge said surface c whereby the device is secured to the beam and for a vertical cut the legs 5 and 6 are secured in vertical position whereupon a novice, or semi-skilled mechanic may turn the crank handle 33 to operate the torch rack 31 up or down, as required, to produce a straight cut, the block 19 having been set to hold the arm 23 and rack 31 for such a cut.

In order to make a bevel cut the clamping screw 37 of block 19 may be loosened, and the shaft arm 23 turned, drawing collar 26 to any desired angle, and then tightened whereupon the rack 31 and torch tip 34 will be caused to move on that angle and produce a desired bevel cut. As the edge 35, of flange 3, seats upon the edge of flange c of the beam, said edge 35 forms the supporting medium for the outfit, and the legs 5 and 6, which, together with the set screws 16 and 17 steady the device, the said legs being adjustable to any necessary angle through means of the wing nuts 9 and 10 in order that they may be accommodated to the contour of the base upon which they seat. After the device has once been set for a particular cut, as many hundreds of such cuts may be made as required without further adjustment. While I have explained the use of my beam cutting outfit as used in vertical operation, it is clearly obvious that it may be used equally as efficiently when placed in horizontal position for horizontal cuts.

Figure 5:
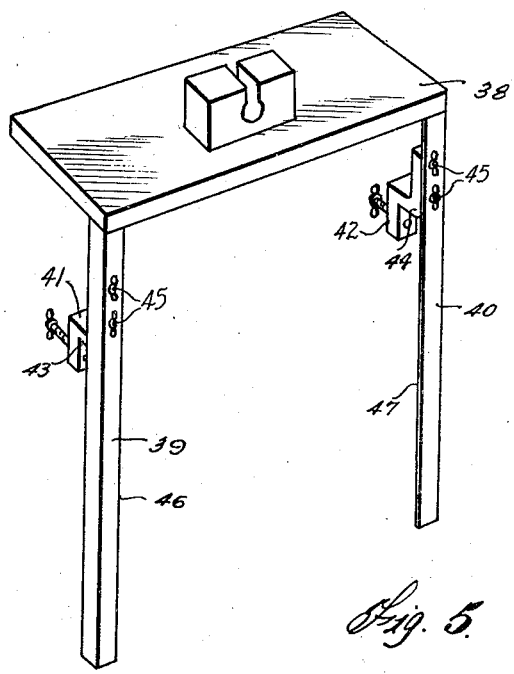
Figure 5 is a perspective view of a modification of the invention.
Figure 6:
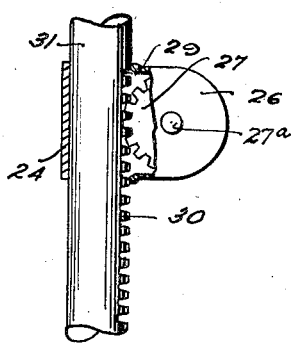
Figure 6 is a broken away detail view of a torch manipulating rack and pinion.

In Figure 5 I show a modification of the device in which the table 38 is provided with fixed legs 39 and 40, to which adjustable brackets 41 and 42 are connected. The horizontal portions 43 and 44 seat upon the edge of a beam and form the main supporting means for the device. The brackets 41 and 42 may be adjusted by means of thumb screws 45 operating through spaced bores in the flanges 46 and 47 of the angle iron legs 39 and 40. Otherwise the device is the same as in the preferred form of the invention.

It is thought that persons skilled in the art to which the invention relates will be able to obtain a clear understanding of the invention after considering the description in connection with the drawings. Therefore, a more lengthy description is regarded as unnecessary.

Minor changes in shape, size, and rearrangement of details and parts such as come within the purview of the invention claimed may be resorted to, in actual practice, if desired.

Having now described my invention, that which I claim to be new, and desire to procure by Letters Patent is:

1. A beam cutting appliance comprising a portable table, a one piece clamp block with flexible jaws pivotally mounted on the table and a torch holding shaft member supported by said jaws in the block, a collar for axial and turning adjustment fixed on said shaft through which the torch is movable along the work surface, a tubular cylinder with external rack teeth for carrying the torch therein, means for operating said cylinder in axial direction, said means comprising a crank operated pinion geared to the rack, said table consisting of an angle iron, one flange of which is adapted to seat upon a beam flange to be cut, hook members with clamping screws fixed to said table for overhanging and clamping said beam flange.

2. A beam cutting appliance comprising a portable table, a one piece clamp block with flexible jaws pivotally mounted on the table and a torch holding shaft member supported by said jaws in the block, a collar for axial and turning adjustment fixed on said shaft through which the torch is movable along the work surface, a tubular cylinder with external rack teeth for carrying the torch therein, means for operating said cylinder in axial direction, said means comprising a crank operated pinion geared to the rack, said table consisting of an angle iron, one flange of which is adapted to seat upon a beam flange to be cut, hook members with clamping screws fixed to said table for overhanging and clamping said beam flange, a pair of steadying legs for the table flange.

3. A beam cutting appliance comprising a portable table, a one piece clamp block with flexible jaws pivotally mounted on the table and a torch holding shaft member supported by said jaws in the block, a collar for axial and turning adjustment fixed on said shaft through which the torch is movable along the work surface, tubular cylinder with external rack teeth for carrying the torch therein, means for operating said cylinder in axial direction, said means comprising a crank operated pinion geared to the rack, said table consisting of an angle iron, one flange of which is adapted to seat upon a beam flange to be cut, hook members with clamping screws fixed to said table for overhanging and clamping said beam flange, a pair of steadying legs for the table flange, and set screws for angularly adjusting and securing said legs on the table.

4. A beam cutting appliance comprising a portable table, a one piece clamp block with flexible jaws pivotally mounted on the table and a torch holding shaft member supported by said jaws in the block, a collar for axial and turning adjustment fixed on said shaft through which the torch is movable along the work surface, tubular cylinder with external rack teeth for carrying the torch therein, means for operating said cylinder in axial direction, said means comprising a crank operated pinion geared to the rack, said table consisting of an angle iron, one flange of which is adapted to seat upon a beam flange to be cut, hook members with clamping screws fixed to said table for overhanging and clamping said beam flange, a pair of steadying legs for the table flange, and set screws for angularly adjusting and securing said legs on the table, said table flange having a cutout portion in its lower edge to permit a torch tip to be raised to the end of the flange being cut.

FORREST M. KELP.

REFERENCES CITED

The following references are of record in the file of this patent:

UNITED STATES PATENTS

| Number | Name | Date |
|---|---|---|
| 1,049,807 | Bucknam | Jan. 7, 1913 |
| 1,051,547 | Bucknam | Jan. 28, 1913 |
| 1,812,239 | Hentschel et al. | June 30, 1931 |
| 1,866,695 | Anderson | July 12, 1932 |
| 2,317,239 | Yoch | Apr. 20, 1943 |